United States Patent
Kambe et al.

(10) Patent No.: US 6,876,782 B2
(45) Date of Patent: Apr. 5, 2005

(54) INTEGRATED TYPE OPTICAL WAVEGUIDE DEVICE

(75) Inventors: Toshiyuki Kambe, Tokyo (JP); Tadahiko Hanada, Tokyo (JP)

(73) Assignee: NEC Corporation, Tokyo (JP)

(*) Notice: Subject to any disclaimer, the term of this patent is extended or adjusted under 35 U.S.C. 154(b) by 163 days.

(21) Appl. No.: 10/326,377

(22) Filed: Dec. 23, 2002

(65) Prior Publication Data

US 2003/0128905 A1 Jul. 10, 2003

(30) Foreign Application Priority Data

Dec. 25, 2001 (JP) .......................... 2001-392442

(51) Int. Cl.⁷ ........................................ G02F 1/035
(52) U.S. Cl. ............................................. 385/3; 385/14
(58) Field of Search ........................ 365/1–4, 8, 9, 365/14, 37, 129–132, 140

(56) References Cited

U.S. PATENT DOCUMENTS 5,917,970 A * 6/1999 Burns et al. .................. 385/24

FOREIGN PATENT DOCUMENTS

| EP | 0 526 023 A2 | 7/1992 |
| JP | 62-036631 | 2/1987 |
| JP | 64-063934 | 3/1989 |
| JP | 05-297420 | 11/1993 |
| JP | 07-020413 | 1/1995 |
| JP | 8-78657 | 3/1996 |
| JP | 10-160977 | 6/1998 |
| JP | 10-227936 | 8/1998 |
| JP | 10-300960 | 11/1998 |
| JP | 2000-022246 | 1/2000 |
| JP | 2003-149614 | 5/2003 |
| JP | 2003-167221 | 6/2003 |

* cited by examiner

Primary Examiner—David V. Bruce
Assistant Examiner—Thomas R Artman
(74) Attorney, Agent, or Firm—McGinn & Gibb, PLLC (57) ABSTRACT

An integrated type optical waveguide device includes an input section which contains at least one first optical waveguide and has at least one input end and a plurality of output ends. A phase shifter section has a plurality of second optical waveguides, each of which has one output end and one input end coupled with a corresponding one of the plurality of output ends of the input section. An output section contains at least one third optical waveguide and has at least one output end and a plurality of input ends, each of which is coupled with the output end of a corresponding one of the plurality of second optical waveguides. A material of each of the plurality of second optical waveguides is different from a material of each of the first and third optical waveguides.

41 Claims, 3 Drawing Sheets

INTEGRATED TYPE OPTICAL WAVEGUIDE DEVICE

BACKGROUND OF THE INVENTION

1. Field of the Invention

The present invention relates to an integrated type optical waveguide device, and more particularly, to the technique to improve the performance of the integrated type optical waveguide device with a hybrid structure.

2. Description of Related Art

Figure 1:
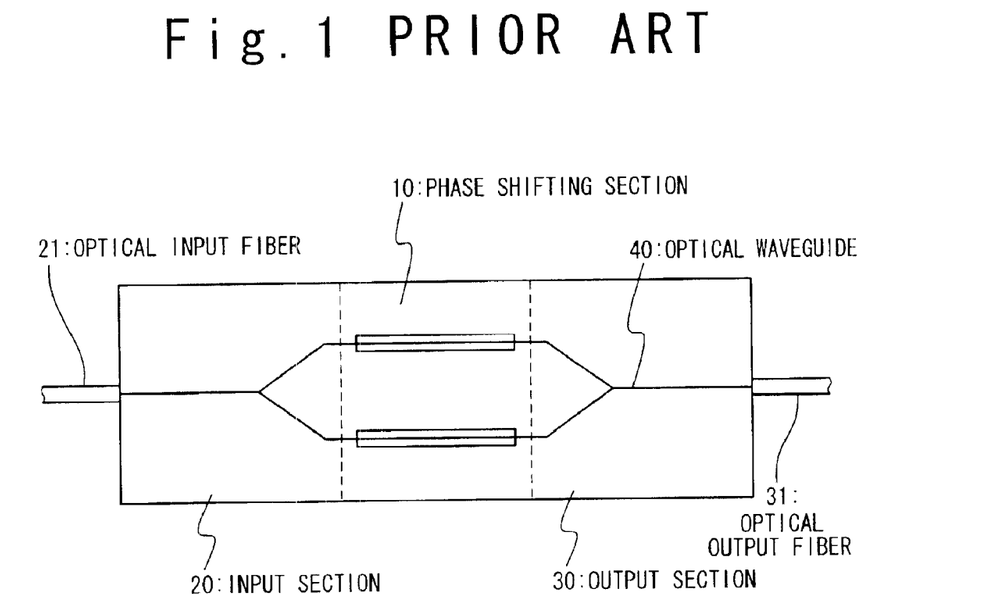
FIG. 1 is a diagram to show a conventional variable optical attenuator.

Conventionally, as one of integrated type optical waveguide devices, a variable optical attenuator (VOA) is known using a waveguide type Mach-Zehnder circuit, as shown in FIG. 1. The variable optical attenuator is composed of a phase shifter section 10, an input section 20 and an output section 30. An interference region is formed in the input section 20 and the output section 30. An optical waveguide 40 is formed in each section. An optical Y-branching or Y-combining circuit or a directional coupler is formed in the interference region to function as a splitter or a combiner.

In the variable optical attenuator, an optical signal inputted from an optical input fiber 21 is branched into two optical signals by the Y-branching circuit which is formed in the input section 20. The two optical signals are sent to the phase shifter section 10. In the phase shifter section 10, the phase of each optical signal is shifted and the phase-shifted optical signals are sent to the output section 30. The two phase-shifted optical signals having different phases are combined by the Y-combining circuit and are outputted to an optical output fiber 31. At the combination, the optical signal is attenuated. An attenuation quantity of the optical signal is controlled based on a quantity of phase shifted by the phase shifter section 10.

The optical waveguide used in the above variable optical attenuator is, as a whole, a single material waveguide such as a silica system waveguide, a polymer waveguide, LiNbO3 (lithium niobate, and hereinafter sometimes referred to as "LN") waveguide, a semiconductor waveguide. For the phase control, the LiNbO$_3$ waveguide or the polymer waveguide using electro-optical effect (EO effect) or the silica-based waveguide or the polymer waveguide using thermal-optical effect (TO effect) is used in many cases.

By the way, when a variable optical attenuator is formed using a diffusion-type optical waveguide which is formed through thermal diffusion into the LN substrate, the control rate can be made high because LN has the electro-optical effect. Also, the power consumption is very small because the optical signal can be controlled using the electric field generated in response to application of a voltage.

On the other hand, there are the following problems in the variable optical attenuator that a diffusion-type optical waveguide is formed on the LN substrate. First, the refraction indexes are different between the diffusion-type optical waveguide and the optical fiber because the material of the diffusion-type optical waveguide is different from that of and the material of the optical fiber. Also, the coupling loss between the optical fiber and the diffusion-type optical waveguide is large because the cross section of the diffusion-type optical waveguide is different from that of the optical fiber section. Second, when the ability to confine light is small so that a bending loss is large because the refraction index difference is small in the diffusion-type optical waveguide. As a result, the optical device cannot be made small because it is not possible to reduce the radius of curvature of the optical waveguide. Third, the optical polarization dependence is caused because a refraction index distribution and a stress distribution in the optical waveguide are asymmetry in a Y-branching circuit and a directional coupler which are formed as an interference region.

On the other hand, when a variable optical attenuator is formed using an embedded type optical waveguide formed by depositing silica-based material on a silicon substrate, there are the following advantages. First, the refraction index of the optical waveguide is same as that of the optical fiber, because the optical fiber is formed of silica-based material. In this case, the coupling loss can be made very small due to the refraction index difference. Also, because the silica-based material is easy in processing, the section shape of the optical waveguide can be made same as that of the optical fiber, resulting in reduction of the coupling loss. Second, the adjustment of the refraction index difference is easy in the silica-based waveguide. Also, it is possible to increase the ability to confine light. Therefore, the bending loss can be made small. Third, because it is possible to make the refraction index distribution symmetrical in the silica-based waveguide, it is possible to reduce the optical polarization dependence, when the Y-branching circuit and the directional coupler are formed of the silica-based material.

On the other hand, in case of a phase shifter, thermo-optical effect must be used because the electro-optical effect cannot be used. The phase shifter using the thermo-optical effect controls a phase shift quantity through the heating. Therefore, the control speed cannot be made high. Also, the power consumption is very large, compared with the phase shifter using the electro-optical effect. Therefore, it is difficult to form an optical device with multiple stages, especially. Also, because the control using the thermo-optical effect is easy to undergo influence of environment temperature, elements influence each other due to difficulty of heat confinement so that the characteristic of the device degrades, especially in an array structure.

The technique for restraining optical polarization dependence is disclosed in Japanese Laid Open Patent Application (JP-A-Showa 62-36631) titled "waveguide-type light modulator". In the waveguide-type light modulator, input light is separated into TE mode light and TM mode light using polarization light splitter (PBS), phase modulation is carried out individually, and then the phase-modulated lights are combined again using the optical polarization combiner. According to the waveguide-type light modulator, the input light is split for every mode, and modulated, so that optical polarization dependence is restrained. However, the waveguide-type light modulator is complicated in the structure because trimming is carried out using a quarter wavelength board.

In conjunction with the above description, a waveguide type optical switch is disclosed in Japanese Laid Open Patent Application (JP-A-Showa 64-63934). In this conventional example, a coupling waveguide is provided between an optical switch section and a coupling optical fiber, and the coupling waveguide is formed of a material smaller in a coupling loss than the optical switch.

Also, an optical switch is disclosed in Japanese Laid Open Patent Application (JP-A-Heisei 5-297420). In this conventional example, the optical switch is composed of a plurality of optical waveguides formed on a substrate and a 2-input and 2-output directional coupler. An element with a complete reflection function is provided for the waveguide on the one output side of the directional coupler and an element with a complete reflection function and a phase modulation element are provided for the waveguide on the other output side of the directional coupler.

Also, a composite light circuit is disclosed in Japanese Laid Open Patent Application (JP-A-Heisei 7-20413). In the composite light circuit of this conventional example, a first light circuit having a waveguide for branching or combining an optical signal is coupled to a second light circuit which has a waveguide for modulating or filtering the optical signal at high speed, through a refraction index adjustment region. In the composite light circuit, a quartz waveguide type light circuit is used as the first light circuit. Also, a lithium niobate system waveguide type light circuit is used as the second light circuit. The composite light circuit can handle eight or more of waveguides at the same time at a high speed.

Also, an optical module is disclosed in Japanese Laid Open Patent Application (JP-A-Heisei 10-160977). In this conventional example, the optical module is composed of an optical hybrid circuit and an optical passive circuit. The optical hybrid circuit is composed of an optical waveguide formed on a substrate, and optical function elements formed on the substrate while keeping optical coupling with the optical waveguide. The optical passive circuit is composed of an optical waveguide formed on another substrate, and is directly connected with the optical hybrid circuit in one end and is connected with an optical fiber in the other end.

Also, a laser oscillation method is disclosed in Japanese Laid Open Patent Application (JP-A-2000-22246A). In this conventional example, reflection sections are provided for ends of an optical fiber in which laser ions are doped, and the doped ions are excited by an excitation laser section and a laser beam with multiple wavelength components is generated. Here, a laser beam outputted from the optical fiber is split for every wavelengths and a plurality of split laser beams are reflected by the reflection sections, respectively.

SUMMARY OF THE INVENTION

Therefore, an object of the present invention is to provide an integrated type optical waveguide device which can reduce a coupling loss with an optical fiber.

Another object of the present invention is to provide an integrated type optical waveguide device which can reduce a bending loss of an optical waveguide regardless of a simple structure.

Another object of the present invention is to provide an integrated type optical waveguide device which can restrain the occurrence of optical polarization dependence.

Another object of the present invention is to provide an integrated type optical waveguide device which can be made small in size.

In an aspect of the present invention, an integrated type optical waveguide device includes an input section, a phase shifter section and an output section. The input section contains at least one first optical waveguide and has at least one input end and a plurality of output ends. The phase shifter section has a plurality of second optical waveguides, each of which has one output end and one input end coupled with a corresponding one of the plurality of output ends of the input section. The output section contains at least one third optical waveguide and has at least one output end and a plurality of input ends, each of which is coupled with the output end of a corresponding one of the plurality of second optical waveguides. The material of each of the plurality of second optical waveguides is different from that of each of the first and third optical waveguides.

Here, each of the first and third optical waveguides may be formed of silica-based material.

Also, the plurality of second optical waveguides may be formed by diffusing metal into a substrate of the phase shifter section. In this case, the phase shifter section substrate desirably is a substrate having electro-optical effect and formed of a material which has a trigonal system crystal structure or a hexagonal system crystal structure, or has a crystal point group of $C_{3v}$, $C_3$, $D_3$, $C_{3h}$ and $D_{3h}$. In this case, the substrate of each of the input section and the output section is desirable to be a silicon substrate.

Also, preferably, a section shape of each of the plurality of output ends of the input section is adaptive to a section shape of the corresponding one of the plurality of second optical waveguides, and a section shape of each of the plurality of input ends of the output section is adaptive to a section shape of the corresponding one of the plurality of second optical waveguides.

Also, each of the first and second optical waveguides may be of an embedded type.

Also, a bending loss in each of the first and second optical waveguides is smaller than a bending loss in each of the plurality of second optical waveguides.

Also, it is desirable that each of the first and second optical waveguides has at least one bending portion, and each of the plurality of second optical waveguides is linear.

Also, the input section may have one input end and two output ends, and may include a Y-splitter connected with the input end and the two output ends. The phase shifter section may have two of the second optical waveguides having electrooptical effect. The output section may have two input ends and one output end, and may include a Y-combiner connected with the two input ends and the output ends. In this case, the Y-splitter splits an optical signal inputted to the input end into two optical signals and outputs from the two output ends. Each of the two second optical waveguides phase-shifts a corresponding one of the two optical signals from the input section in response to application of an electric field. The Y-combiner combines the two phase-shifted optical signals from the phase shifter section to output a new optical signal from the output end.

Also, the input section may have two input ends and two output ends, and may include a first directional coupler connected with the two input ends and the two output ends. The phase shifter section may have two of the second optical waveguides having electrooptical effect. The output section may have two input ends and two output ends, and may include a second directional coupler connected with the two input ends and the two output ends. In this case, the first directional coupler couples two optical signals inputted to the two input ends and outputs from the two output ends. Each of the two second optical waveguides phase-shifts a corresponding one of the two optical signals from the input section in response to application of an electric field. The second directional coupler couples the two phase-shifted optical signals from the phase shifter section to output new optical signals from the two output ends.

In another aspect of the present invention, an integrated type optical waveguide device includes an input array section, a phase shifter array section and an output array section. A plurality of input sections are arranged in an array in the input array section, and a plurality of phase shifter sections are arranged in an array in correspondence with the input array section in a phase shifter array section. A plurality of output sections are arranged in an array in correspondence with the phase shifter array section in the output array section. Each of the plurality of input sections contains at least one first optical waveguide and has a plurality of output ends. Each of the plurality of phase shifter sections has a plurality of second optical waveguides, each of which has one output end and one input end coupled with a corresponding one of the plurality of output ends of a corresponding one of the plurality of input sections. Each of the plurality of output sections contains at least one third optical waveguide and has a plurality of input ends, each of which is coupled with the output end of a corresponding one of the plurality of second optical waveguides. A material of each of the plurality of second optical waveguides is different from a material of each of the first and third optical waveguides.

Here, each of the first and third optical waveguides may be formed of silica-based material.

Also, the plurality of second optical waveguides may be formed by diffusing metal into a substrate of the phase shifter section. In this case, the phase shifter section substrate desirably is a substrate having electro-optical effect and formed of a material which has a trigonal system crystal structure or a hexagonal system crystal structure, or has a crystal point group of $C_{3v}$, $C_3$, $D_3$, $C_{3h}$ and $D_{3h}$. In this case, the substrate of each of the input section and the output section is desirable to be a silicon substrate.

Also, preferably, a section shape of each of the plurality of output ends of the input section is adaptive to a section shape of the corresponding one of the plurality of second optical waveguides, and a section shape of each of the plurality of input ends of the output section is adaptive to a section shape of the corresponding one of the plurality of second optical waveguides.

Also, each of the first and second optical waveguides may be of an embedded type.

Also, a bending loss in each of the first and second optical waveguides is smaller than a bending loss in each of the plurality of second optical waveguides.

Also, it is desirable that each of the first and second optical waveguides has at least one bending portion, and each of the plurality of second optical waveguides is linear.

Also, the input section may have one input end and two output ends, and may include a Y-splitter connected with the input end and the two output ends. The phase shifter section may have two of the second optical waveguides having electrooptical effect. The output section may have two input ends and one output end, and may include a Y-combiner connected with the two input ends and the output ends. In this case, the Y-splitter splits an optical signal inputted to the input end into two optical signals and outputs from the two output ends. Each of the two second optical waveguides phase-shifts a corresponding one of the two optical signals from the input section in response to application of an electric field. The Y-combiner combines the two phase-shifted optical signals from the phase shifter section to output a new optical signal from the output end.

Also, the input section may have two input ends and two output ends, and may include a first directional coupler connected with the two input ends and the two output ends. The phase shifter section may have two of the second optical waveguides having electrooptical effect. The output section may have two input ends and two output ends, and may include a second directional coupler connected with the two input ends and the two output ends. In this case, the first directional coupler couples two optical signals inputted to the two input ends and outputs from the two output ends. Each of the two second optical waveguides phase-shifts a corresponding one of the two optical signals from the input section in response to application of an electric field. The second directional coupler couples the two phase-shifted optical signals from the phase shifter section to output new optical signals from the two output ends.

DESCRIPTION OF THE PREFERRED EMBODIMENTS

Hereinafter, an integrated type optical waveguide device according to the present invention will be described in detail with reference to the attached drawings. The present invention is accomplished based on the idea that the optical waveguide is formed to have a hybrid structure by using the feature of LN-based material and the feature of silica-based material.

First Embodiment

Figure 2:
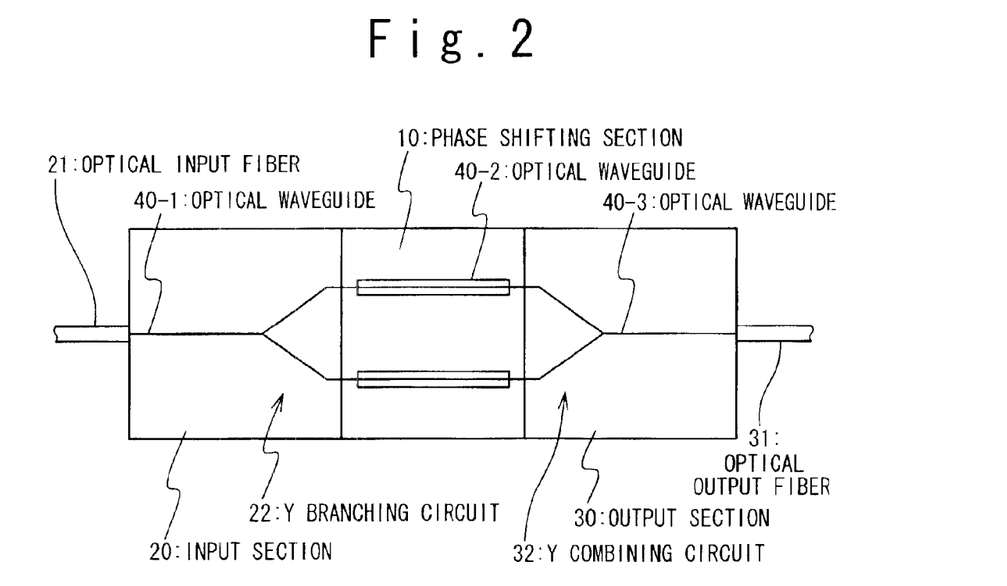
FIG. 2 is a diagram showing the structure of a variable optical attenuator as an integrated type optical waveguide device according to a first embodiment of the present invention.

FIG. 2 is a diagram showing the structure of a variable optical attenuator using a waveguide-type Mach-Zehnder circuit as an example of the integrated type optical waveguide device according to the first embodiment of the present invention. The variable optical attenuator is composed of a phase shifter section 10, an input section 20 and output section 30. An interference region is formed in each of the input section 20 and the output section 30. An optical waveguides 40-1 is formed in the input section 20, optical waveguides 40-2 are formed in the phase shifter section 10, and an optical waveguide 40-3 is formed in the output section 30. Also, a Y-branching circuits 22 functioning as an optical splitter is provided in the input section 20, and a Y-combining circuit 32 functioning as an optical combiner is provided in the output section 20.

The phase shifter section 10 has two linear diffusion type optical waveguides 40-2 formed by thermally diffusing metal such as Ti into a substrate composed of lithium niobate ($LiNbO_3$: LN). It should be noted that the phase shifter section 10 has a structure in which a plurality of electrodes are arranged around of each of the two optical waveguides 40-2. However, because the structure is well known, the description and illustration are omitted. In the phase shifter section 10, a phase shift quantity of an optical signal to be propagated in the optical waveguide 40-2 is determined based on the magnitude of an electric field which is generated through application of a voltage between the plurality of electrodes.

The substrate is cut down to be X-cut and Z-axis propagation and is used for the phase shifter section 10. The two parallel optical waveguides 40-2 are formed on the surface on the X-cut plane (the YZ plane) of the substrate and the waveguided light propagates along the Z-axis (optical axis).

In the first embodiment, lithium niobate (LN) is used as an example of the material of the substrate, but the material of the substrate is not limited to lithium niobate. As the substrate used in the present invention, the substrate may be used which is composed of the material which has uniaxial crystals such as trigonal system crystal and hexagonal system crystal or in which the point group of the crystal is $C_{3v}$, $C_3$, $D_3$, $C_{3h}$ and $D_{3h}$. These materials have a refraction index adjustment function in the refraction index changes based on an applied electric field and has an opposite sign of the refraction index change depending on a light propagation mode. As a specific example, in addition to the lithium niobate, lithium tantalite ($LiTaO_3$:LT), $\beta$-$BaB_2O_4$ (BBO), and $LiIO_3$ can be used.

The optical waveguide 40-2 is formed by patterning a Ti film to about 100 nm, and heating for about 12 to 40 hours at the temperature of 1000° C. for thermal diffusion. The optical waveguide 40-2 with the width of about 5 μm is formed on the surface of the substrate to extend through the substrate.

The Y-branching circuit 22 in the input section 20 is composed of the optical waveguide 40-1 of an embedded type, which is formed by depositing a silicon oxide ($SiO_2$) film on a silicon substrate (Si) and embedding the silicon oxide film as a waveguide by using the well-known technique. In the same way, the Y-combining circuit 32 in the output section 30 is composed of an optical waveguide 40-3 of the embedded type which is formed by depositing a silicon oxide ($SiO_2$) film on a silicon substrate (Si) and embedding the silicon oxide film as the waveguide by using the well-known technique.

The phase shifter section 10, input section 20 and output section 30 are formed as mentioned above, and are coupled one after another by adjusting the positions of the optical waveguides 40-1, 40-2 and 40-3, as shown in FIG. 2. Thus, the variable optical attenuator is completed. An optical input fiber 21 for inputting an optical signal is connected to an input end of the optical waveguide 40-1 in the input section 20 of the variable optical attenuator and an optical output fiber 31 for outputting an optical signal is connected to an output end of the optical waveguide 40-3 in the output section 30. The output ends of the of the optical waveguide 40-1 in the input section 20 are connected with the optical waveguides 40-2 and input ends of the optical waveguide 40-3 are connected with the optical waveguides 40-2, respectively.

In the variable optical attenuator formed as mentioned above, an inputted optical signal is branched into two optical signals by the Y-branching circuit 22 which is formed in the input section 20, and the two optical signals are sent from the optical input fiber 21 to the phase shifter section 10. In the phase shifter section 10, the phase of each optical signal is shifted in response to application of an electric field, and the phase-shifted optical signals are sent to the output section 30. The Y-combining circuit 32 of the output section 30 combines the two phase-shifted optical signals with different phases. In this way, the waveguided light propagating in the optical waveguide 40-3 is attenuated and outputted to the light output fiber 31. An attenuation quantity of the waveguided light is controlled based on a shift quantity of the phase which is shifted by the phase shifter section 10.

According to the variable light modulator described above, because LN-based material is used for the substrate of the phase shifter section 10, the phase shift quantity can be controlled based on the magnitude of the electric field generated through application of a voltage using the electro-optical effect. Therefore, the control of the phase shift quantity is easy, compared with a case using the thermo-optical effect. Also, the control speed can be made faster, and moreover the low power consumption can be realized because it is not necessary to flow current for generation of the electric field. Also, it is difficult to undergo influence of the environment temperature because the thermo-optical effect is not used.

Also, the optical waveguide 40-1 as the Y-branching circuit 22 in the input section 20 is coupled to the optical input fiber 21, and the optical waveguide 40-3 as the Y-combining circuit 32 in the output section 30 is connected with the optical output fiber 31. The optical waveguide 40-1 in the input section 20 and the optical waveguide 40-3 in the output section are formed of silica-based material.

Therefore, the refraction indexes of the waveguides 40-1 and 40-3 are same as the refraction indexes of the optical input fiber 21 and the optical output fiber 31. According to the structure, the coupling loss due to the difference in the refraction index between the waveguides to be joined can be reduced.

Also, the processing of the section shape of the embedded type optical waveguide 40-1 and 40-3 composed of the silica-based material is easy. Therefore, it is possible to process the embedded type optical waveguide 40-1 or 40-3 to fit with the section shapes of optical input fiber 21 or optical output fiber 31. According to the structure, the coupling loss due to the difference in the section shape between the embedded type optical waveguide of the variable optical attenuator and the optical input fiber 21 or the optical output fiber 31 can be reduced.

The diffusion-type optical waveguide 40-2 formed in the phase shifter section 10 is joined with the embedded type optical waveguide formed in the input section 20 and the output section 30. In this case, because the processing of the embedded type optical waveguide 40-1 and 40-3 composed of the silica-based material is easy, the section shape of the embedded type optical waveguide is first processed and then the embedded type optical waveguide is fit with the diffusion-type optical waveguide. Thus, the spot size of the diffusion-type optical waveguide can be made matched to or coincident with that of the embedded type optical waveguide so that the coupling loss can be reduced.

Also, because the refraction index difference is small in the diffusion-type optical waveguide, the ability to confine light is small so that a bending loss is large. However, the optical waveguides 40-1 and 40-3 formed of the silica-based material are used for bending portions as in the Y-branching circuits 22 in the input section 20 and the Y-combining circuit 32 in the output section 30. Therefore, the radius of curvature of the optical waveguides 40-1 and 40-3 can be made small. As a result, the integrated type optical waveguide device can be made small.

Also, the input section 20 and the output section 30 where the Y-branching circuit 22 and the Y-combining circuit 32 are formed are composed of the embedded type optical waveguides 40-1 and 40-3 formed of the silica-based material. Therefore, the optical polarization dependence does not occur, because it is possible to make a refraction index distribution symmetry. It should be noted that in case of a ridge type, the optical polarization dependence occurs, even if the optical waveguide is formed of the silica-based material. However, because the optical waveguide according to the first embodiment is of an embedded type, the optical polarization dependence never causes.

Figure 3:
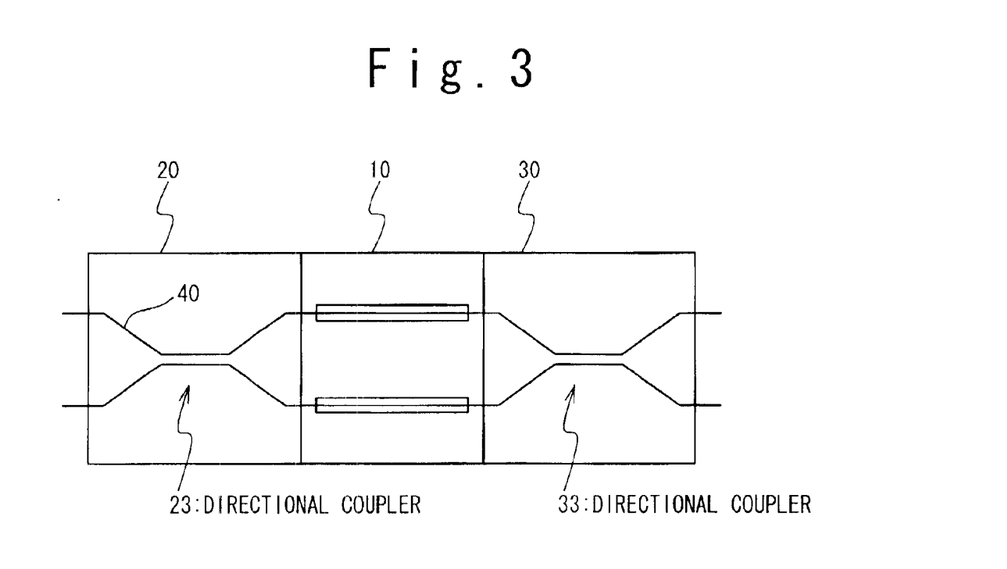
FIG. 3 is a diagram showing the structure of a modification of the integrated type optical waveguide device according to the first embodiment of the present invention.

It should be noted that in the variable optical attenuator according to the above-mentioned first embodiment, the Y-branching circuits 22 and the Y-combining circuit 32 are formed in the input section 20 and the output section 30, respectively. However, directional couplers 23 and 33 may be formed, respectively, as shown in FIG. 3. In this case, the same operation and effect as those of the above-mentioned first embodiment can be achieved.

Second Embodiment

In the integrated type optical waveguide device according to the second embodiment of the present invention, the variable optical attenuators as the integrated type optical waveguide device according to the first embodiment are arranged in an array to form a variable optical attenuator array.

Figure 4:
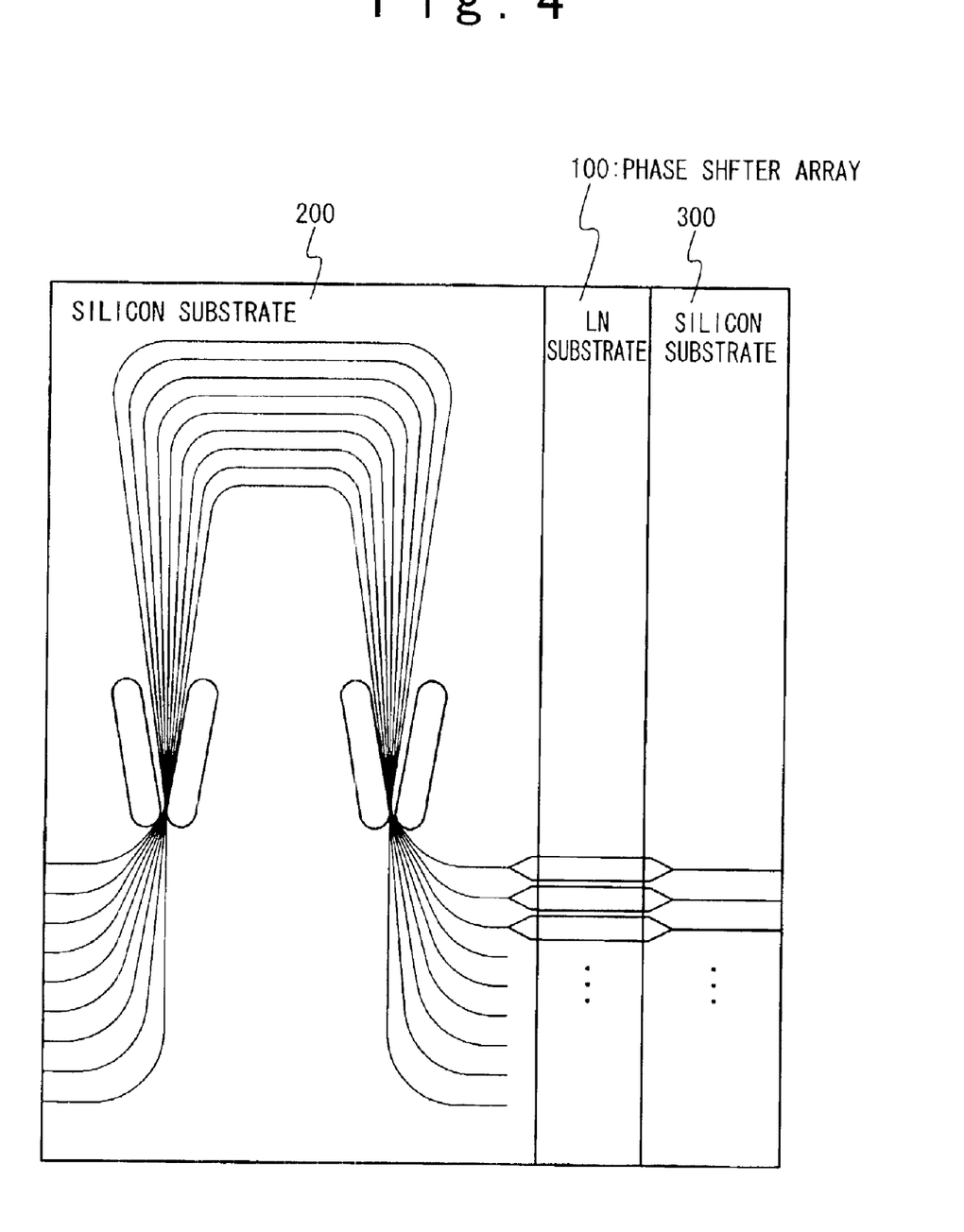
FIG. 4 is a diagram showing the structure of a variable optical attenuator array as the integrated type optical waveguide device according to a second embodiment of the present invention.

FIG. 4 is a diagram showing the structure of the integrated type optical waveguide device according to the second embodiment of the present invention. The integrated type optical waveguide device is composed of a phase shifter section array 100, an input section 200 and an output section 300. The phase shifter section array 100 is formed by arranging a plurality of phase shifter sections 10 according to the first embodiment in an array, and each of the phase shifter sections has a linear diffusion-type optical waveguide 40-2 formed through the thermal diffusion into the LN-based substrate. It should be noted that in the second embodiment, a case that the input section 200 is an array waveguide grid (AWG) is shown as an example. Besides, the input section 200 may be formed to have the same structure as the output section 300.

In the input section 200, one end section of the embedded type optical waveguide 40-1 composed of the silica-based material and formed on the silicon substrate is coupled to one end of a corresponding diffusion-type optical waveguide in the plurality of phase shifter sections of the phase shifter section array 100. Also, one end of the embedded type optical waveguide 40-3 composed of the silica-based material in the output section 300 and formed on the silicon substrate is coupled to the other end of the corresponding diffusion-type optical waveguide of the plurality of the phase shifter section of the phase shifter section array 100.

The operation of each variable optical attenuator of the integrated type optical waveguide device according to the second embodiment is the same as that of the variable optical attenuator as the integrated type optical waveguide device according to above-mentioned first embodiment.

According to the integrated type optical waveguide device formed as mentioned above, the same operation and effect as the integrated type optical waveguide device according to the first embodiment can be achieved.

As described above in detail, according to the present invention, the integrated type optical waveguide device can be provided in which it is possible to reduce the coupling loss with the optical fiber and the bending loss of the optical waveguide can be made small regardless of the simple structure, and the generation of the optical polarization dependence can be restrained, and which can be made small.

What is claimed is:

1. An integrated type optical waveguide device comprising:
    an input section which contains at least one first optical waveguide and has at least one input end and a plurality of output ends;
    a phase shifter section which has a plurality of second optical waveguides, each of which has one output end and one input end coupled with a corresponding one of said plurality of output ends of said input section; and
    an output section which contains at least one third optical waveguide and has at least one output end and a plurality of input ends, each of which is coupled with the output end of a corresponding one of said plurality of second optical waveguides,
    wherein a material of each of said plurality of second optical waveguides is different from a material of each of said first and third optical waveguides, and
    wherein said output section comprises a Y-combiner.

2. The integrated type optical waveguide device according to claim 1, wherein each of said first and third optical waveguides is formed of silica-based material.

3. The device of claim 2, wherein said silica-based material comprises Silicon Oxide deposited on a Silicon substrate.

4. The integrated type optical waveguide device according to claim 1, wherein said plurality of second optical waveguides is formed by diffusing metal into a substrate of said phase shifter section.

5. The integrated type optical waveguide device according to claim 4, wherein said phase shifter section substrate comprises a substrate having an electro-optical effect and comprising a material which has a trigonal system crystal structure or a hexagonal system crystal structure, or has a crystal point group of C3v, C3, D3, C3h and D3h.

6. The integrated type optical waveguide device according to claim 5, wherein a substrate of each of said input section and said output section comprises a silicon substrate.

7. The device of claim 4, wherein said diffusing metal comprises Titanium.

8. The integrated type optical waveguide device according to claim 1, wherein a section shape of each of said plurality of output ends of said input section is adaptive to a section shape of said corresponding one of said plurality of second optical waveguides, and
    a section shape of each of said plurality of input ends of said output section is adaptive to a section shape of said corresponding one of said plurality of second optical waveguides.

9. The integrated type optical waveguide device according to claim 1, wherein each of said first and third optical waveguides comprises an embedded type.

10. The integrated type optical waveguide device according to claim 1, wherein a bending loss in each of said first and third optical waveguides is smaller than a bending loss in each of said plurality of second optical waveguides.

11. The integrated type optical waveguide device according to claim 1, wherein each of said first and third optical waveguides comprises at least one bending portion, and each of said plurality of second optical waveguides is linear.

12. The integrated type optical waveguide device according to claim 1, wherein said input section comprises one input end and two output ends, and further comprises a Y-splitter connected with said input end and said two output ends,
    said phase shifter section comprises two of said second optical waveguides comprising an electrooptical effect, and
    said output section comprises two input ends and one output end, and further comprises said Y-combiner connected with said two input ends and said output ends.

13. The integrated type optical waveguide device according to claim 12, wherein said Y-splitter splits an optical signal inputted to said input end into two optical signals and outputs from said two output ends, each of said two second optical waveguides phase-shifts a corresponding one of said two optical signals from said input section in response to application of an electric field, and said Y-combiner combines said two phase-shifted optical signals from said phase shifter section to output a new optical signal from said output end.

14. The integrated type optical waveguide device according to claim 1, wherein said input section comprises two input ends and two output ends, and further comprises a first directional coupler connected with said two input ends and said two output ends, said phase shifter section comprises two of said second optical waveguides comprising an electrooptical effect, and said output section comprises two input ends and two output ends, and further comprises a second directional coupler connected with said two input ends and said two output ends.

15. The integrated type optical waveguide device according to claim 14, wherein said first directional coupler couples two optical signals inputted to said two input ends and outputs from said two output ends, each of said two second optical waveguides phase-shifts a corresponding one of said two optical signals from said input section in response to application of an electric field, and said second directional coupler couples said two phase-shifted optical signals from said phase shifter section to output new optical signals from said two output ends.

16. The device of claim 1, wherein a material of said phase shifter section comprises Lithium Niobate.

17. The device of claim 1, wherein said phase shifter section comprises a plurality of electrodes arranged around each of said second optical waveguides.

18. The device of claim 1, wherein said plurality of second optical waveguides are substantially parallel.

19. The device of claim 1, wherein the material of said phase shifter section comprises one of $LiTaO_3$, $BaB_2O_4$, and $LiIO_3$.

20. The device of claim 1, wherein at least one of the refractive index of said first optical wave guide is the same as that of an optical input fiber and the refractive index of said third optical waveguide is the same as that of an optical output fiber.

21. The device of claim 1, wherein at least one of said input section and said output section comprises an array waveguide grid.

22. An integrated type optical waveguide device comprising:

an input array section comprising a plurality of input sections arranged in an array;

a phase shifter array section comprising a plurality of phase shifter sections are arranged in an array in correspondence with said input array section; and an output array section comprising a plurality of output sections arranged in an array in correspondence with said phase shifter array section, wherein each of said plurality of input sections comprises at least one first optical waveguide and has a plurality of output ends, each of said plurality of phase shifter sections comprises a plurality of second optical waveguides, each of which comprises one output end and one input end coupled with a corresponding one of said plurality of output ends of a corresponding one of said plurality of input sections, and each of said plurality of output sections comprises at least one third optical waveguide and a plurality of input ends, each of which is coupled with the output end of a corresponding one of said plurality of second optical waveguides, a material of each of said plurality of second optical waveguides comprises a material that is different from a material of each of said first and third optical waveguides, and wherein at least one of said plurality of output sections comprises a Y-combiner.

23. The integrated type optical waveguide device according to claim 22, wherein each of said first and third optical waveguides comprises a silica-based material.

24. The device of claim 23, wherein said silica-based material comprises Silicon Oxide deposited on a Silicon substrate.

25. The integrated type optical waveguide device according to claim 22, wherein said plurality of second optical waveguides is formed by diffusing metal into a substrate of said phase shifter section.

26. The integrated type optical waveguide device according to claim 25, wherein said phase shifter section substrate comprises a substrate comprising an electro-optical effect and comprising a material which comprises a trigonal system crystal structure or a hexagonal system crystal structure, or has a crystal point group of C3v, C3, D3, C3h, and D3h.

27. The integrated type optical waveguide device according to claim 26, wherein a substrate of each of said input section and said output section comprises a silicon substrate.

28. The device of claim 25, wherein said diffusing metal comprises Titanium.

29. The integrated type optical waveguide device according to claim 22, wherein a section shape of each of said plurality of output ends of said input section is adaptive to a section shape of said corresponding one of said plurality of second optical waveguides, and a section shape of each of said plurality of input ends of said output section is adaptive to a section shape of said corresponding one of said plurality of second optical waveguides.

30. The integrated type optical waveguide device according to claim 22, wherein each of said first and third optical waveguides comprises an embedded type.

31. The integrated type optical waveguide device according to claim 22, wherein a bending loss in each of said first and third optical waveguides is smaller than a bending loss in each of said plurality of second optical waveguides.

32. The integrated type optical waveguide device according to claim 22, wherein each of said first and third optical waveguides comprises at least one bending portion, and each of said plurality of second optical waveguides is linear.

33. The integrated type optical waveguide device according to claim 22, wherein said one of said plurality of input sections comprises one input end and two output ends, and further comprises a Y-splitter connected with said input end and said two output ends, said phase shifter section comprises two of said second optical waveguides comprising an electrooptical effect, and said one of said plurality of output sections comprises two input ends and one output end, and further comprises said Y-combiner connected with said two input ends and said output ends.

34. The integrated type optical waveguide device according to claim 33, wherein said Y-splitter splits an optical signal inputted to said input end into two optical signals and outputs from said two output ends, each of said two second optical waveguides phase-shifts a corresponding one of said two optical signals from said input section in response to application of an electric field, and said Y-combiner combines said two phase-shifted optical signals from said phase shifter section to output a new optical signal from said output end.

35. The integrated type optical waveguide device according to claim 22, wherein said input section comprises two input ends and two output ends, and further comprises a first directional coupler connected with said two input ends and said two output ends, said phase shifter section comprises two of said second optical waveguides comprising an electrooptical effect, and said output section comprises two input ends and two output ends, and further comprises a second directional coupler connected with said two input ends and said two output ends.

36. The integrated type optical waveguide device according to claim 35, wherein said first directional coupler couples two optical signals inputted to said two input ends and outputs from said two output ends, each of said two second optical waveguides phase-shifts a corresponding one of said two optical signals from said input section in response to application of an electric field, and said second directional coupler couples said two phase-shifted optical signals from said phase shifter section to output new optical signals from said two output ends.

37. The device of claim 22, wherein a material of said phase shifter section comprises Lithium Niobate.

38. The device of claim 22, wherein said phase shifter section comprises a plurality of electrodes arranged around each of said second optical waveguides.

39. The device of claim 22, wherein said plurality of second optical waveguides are substantially parallel.

40. The device of claim 22, wherein the material of said phase shifter section comprises one of $LiTaO_3$, $BaB_2O_4$, and $LiIO_3$.

41. The device of claim 22, wherein at least one of the refractive index of said first optical waveguide is the same as an optical input fiber and the refractive index of said third optical waveguide is the same as an optical output fiber.

* * * * *